United States Patent [19]
Williams

[11] 3,758,051
[45] Sept. 11, 1973

[54] VELOCITY CONTROL AND ORIENTATION OF A SPIN-STABILIZED BODY

[75] Inventor: Donald D. Williams, Inglewood, Calif.

[73] Assignee: Hughes Aircraft Company, Culver City, Calif.

[22] Filed: Aug. 21, 1964

[21] Appl. No.: 391,187

Related U.S. Application Data

[63] Continuation-in-part of Ser. No. 22,733, April 18, 1960, abandoned.

[52] U.S. Cl. ............................. 244/1 SA, 244/1 SS
[51] Int. Cl. ............................................. B64g 1/10
[58] Field of Search........................... 244/1 SS, 14; 102/50

[56] References Cited
UNITED STATES PATENTS

| | | | |
|---|---|---|---|
| 2,852,208 | 9/1958 | Schlesman | 244/14 |
| 2,973,162 | 2/1961 | Haeussermann | 244/1 SS |
| 2,991,027 | 7/1961 | Geyling | 244/1 SS X |
| 3,216,674 | 11/1965 | McLean | 244/14 H |

OTHER PUBLICATIONS

Kurzhals et al, "Dynamics and Stabilization of the Rotating Space station," Astronautics, 9/62, pp. 25–29.
Yaffee, "U.S. Plans Gyro-Stabilized Solar Satellite," Aviation Week, 10/12/59, pp. 26–27.
Cole, "Guidance and Control of 24–Hour Satellite," Navigation, Winter 1962–1963, pp. 270–278.

*Primary Examiner*—Milton Buchler
*Assistant Examiner*—Barry L. Kelmachter
*Attorney*—James K. Haskell and Noel B. Hammond

[57] ABSTRACT

An orbiting satellite having a radio antenna and solar cells is oriented with respect to the earth and the sun to optimize the satellite antenna gain and the solar cell illumination. The satellite enters its orbit around the earth with its spin-axis initially oriented perpendicular to the earth's axis. The desired orientation of the satellite spin axis is parallel to the earth's axis and means is provided for processing the spin axis of the satellite to the desired orientation by applying a reactive force to the satellite in a proper plane. Nutation of the satellite is damped by a viscous damper provided therein. Means is provided for sensing the orientation of the satellite relative to the earth, the sun, or both. Deviations from the correct orbital period, eccentricity, and phase are determined from observations made from the earth. Means is provided to correct orbital deviations by applying a reactive force to the satellite with a predetermined amount of force and in the proper direction.

3 Claims, 12 Drawing Figures

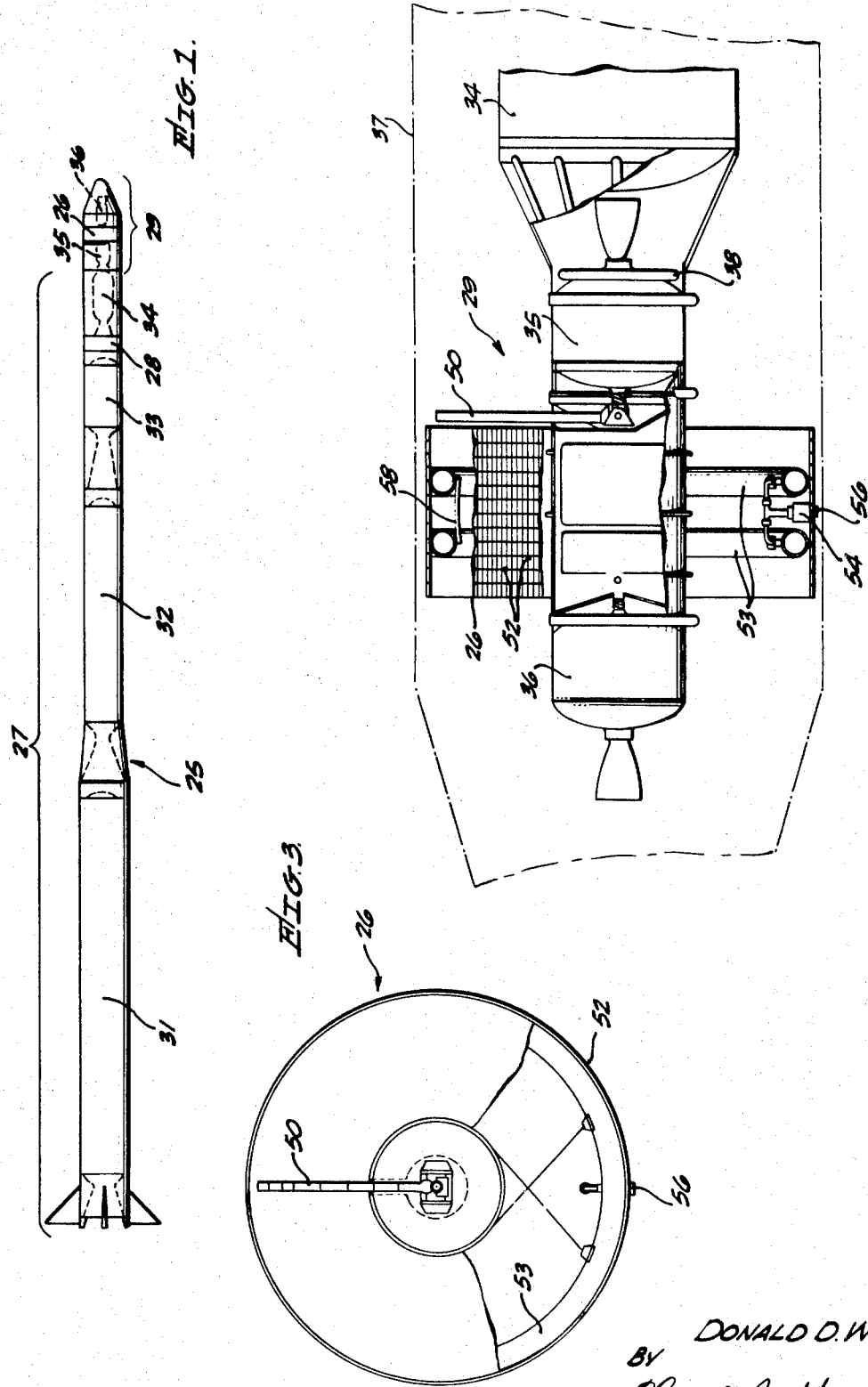

INVENTOR.
DONALD D. WILLIAMS,
BY Noel B. Hammond
AGENT.

INVENTOR.
DONALD D. WILLIAMS,
BY
Noel B. Hammond
AGENT.

VELOCITY CONTROL AND ORIENTATION OF A SPIN-STABILIZED BODY

This is a continuation-in-part of my prior copending application Ser. No. 22,733, filed Apr. 18, 1960 now abandoned.

The present invention relates to space vehicles such as satellites and, more particularly, to a method and apparatus for controlling the velocity, and the orientation of the spin axis, of a spin-stabilized space vehicle.

Man-made satellites placed into orbit around the earth are often provided with equipment requiring the satellites to be accurately placed into specific orbits and to be oriented in a predetermined manner. For example, a satellite for use as a radio communication relay may have to be accurately placed into a west-to-east circular orbit in the plane of the earth's equator and having a period of 24 hours. Such an orbit is desirable because the satellite hovers above a single point on the earth, inasmuch as both the satellite and the earth have the same angular velocity. A satellite that hovers above a single point on the earth must be accurately placed into an orbit having a 22,750 nautical mile radius from the center of the earth and the satellite must travel around the orbit with a linear velocity of 10,090 feet per second.

An active communication satellite, that is, one which is equipped to receive and retransmit radio waves, is provided with an antenna and may be provided with solar cells as a source of power, both of which require accurate orientation of the satellite to be useful. To increase the antenna gain, the satellite should be spinning about the antenna axis and this axis should be parallel to the earth's axis. In this way, the antenna radiation pattern may be omnidirectional about the antenna axis but have a narrow beam width about a plane extending through the center of the satellite perpendicular to the antenna axis. This system provides increased antenna gain, 8 decibels, for example, in the direction of the earth and permits the use of a radio transmitter having a relatively low power output, thus reducing size and weight requirements. Further, solar cells need be placed only on those surfaces of the satellite that intercept maximum light from the sun.

It may be found that the satellite drifts relative to a precise stationary orbit and requires correction over a period of time. The possible drift due to errors in the velocity of the satellite has been determined to be 39.4 degrees per year per foot per second of velocity error.

To keep the cost of the satellite and the launching rocket as low as possible, the satellite and its apparatus for orientation and stabilization should be simple in operation, light in weight, and small in size.

Accordingly, it is an object of the present invention to provide apparatus for orienting a spin-stablized vehicle, such as a satellite, and also for controlling the velocity of the satellite for establishing a desired orbit.

Another object of the invention is the provision of apparatus for correcting the orbit of a spin-stabilized vehicle, such as a satellite.

Another object of the invention is the provision of apparatus for precessing the spin axis of a spin-stabilized body from a first position to a second position perpendicular to the first position.

Another object of the invention is the provision of means for damping the nutation of a spin-stabilized body.

Yet another object of the present invention is to provide increased antenna gain in a spinning vehicle, such as a space satellite.

A further object of the invention is the provision of optimum solar cell illumination in an orbiting space satellite.

Still another object of the present invention is to provide apparatus for orienting a spin-stabilized satellite that is simple in form, reliable in operation, small in size, light in weight, inexpensive, and low in power consumption.

In accordance with these and other objects of the invention, an orbiting satellite having a radio antenna and solar cells is oriented with respect to the earth and the sun to optimize the satellite antenna gain and the solar cell illumination. The satellite enters its orbit around the earth with its spin-axis initially oriented perpendicular to the earth's axis. The desired orientation of the satellite spin axis is parallel to the earth's axis and means is provided for precessing the spin axis of the satellite to the desired orientation by applying a reactive force to the satellite in a proper plane. Nutation of the satellite is damped by a viscous damper provided therein. Means is provided for sensing the orientation of the satellite relative to the earth, sun, or both.

Deviations from the correct orbital period, eccentricity, and phases are determined from observations made from the earth. Means is provided to correct orbital deviations by applying a reactive force to the satellite with a predetermined amount of force and in the proper direction.

The following specification and the accompanying drawings respectively describe and illustrate an exemplification of the present invention. Consideration of the specification and the drawings will provide a complete understanding of the invention, including the novel features and objects thereof. Like reference characters are used to designate like parts through the figures of the drawings.

FIG. 1 is an elevation of an exemplary embodiment of a satellite launching vehicle in accordance with the present invention showing the relationship of the propulsion rockets to the satellite;

FIG. 2 is an enlarged elevation of a portion of the launching vehicle of FIG. 1 showing the relationship of fourth, fifth, and sixth stage rockets to the satellite and enclosing heat shield;

FIG. 3 is a plan of the satellite showing an antenna provided thereon in a folded position;

Figure 5:
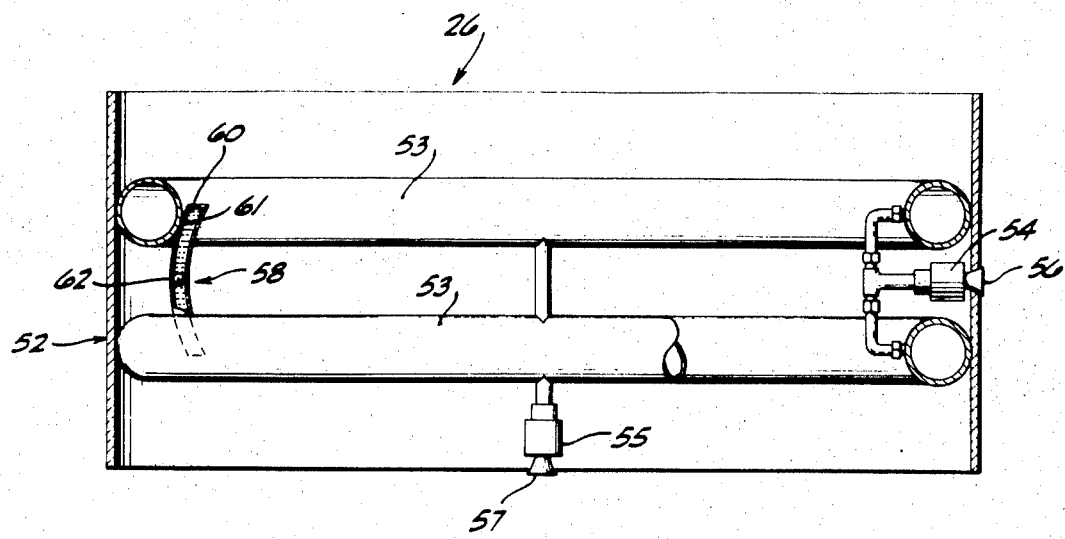
FIG. 5 is a sectional elevation of a portion of the satellite illustrating the arrangement of an attitude and velocity control system including compressed gas tanks, valves and nozzles and showing a nutation damping arrangement.

Although the present invention does not embrace a vehicle for conveying a satellite to an orbit, a brief description of a representative rocket vehicle useful for this purpose is included. Reference is hereby made to the book "Rocket Encyclopedia Illustrated", edited by J. W. Herrick and E. Burgess, Aero Publishers, Inc., Los Angeles, Calif., 1959, and to the bibliography therein for details of rocket vehicles and definitions of terms.

There is shown in FIG. 1 an exemplary embodiment of a rocket vehicle, indicated generally by the numeral 25, for accurately launching a space vehicle, such as a satellite 26, into a predetermined orbit around the earth. In the present example, the orbit into which the satellite 26 is to be placed is a so-called stationary or synchronous orbit which is a circular west-to-east equatorial orbit having a period of 24 hours. This orbit has a radius of 22,750 nautical miles from the center of the earth and the satellite 26 travels at a velocity of 10,090 feet per second (fps) in the direction of the earth's rotation and appears to stand still or hover over one point on the earth's surface. The satellite 26 may then be used, for example, to relay radio communications over long distances.

The primary or booster portion of the rocket vehicle 25 is a multistage rocket power plant designated by the numeral 27 in FIG. 1 and comprising first, second, third, and fourth stage rockets 31, 32, 33, and 34, respectively, arranged in tandem. The first, second, and third stage rockets 31, 32, and 33 are provided with guidance elements, such as jet vanes (not shown) which are disposed in the jet stream from the rocket exhaust nozzles to deflect the jet and thus obtain a turning force to control the direction and attitude of the vehicle 25. Such an arrangement is shown on page 248 of the above-referenced Rocket Encyclopedia. The fourth stage rocket 34 is provided with means, such as spin nozzles or spin rockets (not shown) to rotate the fourth stage rocket 34 about its longitudinal axis for stabilization and such arrangements are shown and described on pages 456 and 457 of the Rocket Encyclopedia. The ignition of the rocket engines, jettisoning of burned out rockets, guidance, and spin stabilization of the multistage rocket power plant 27 is automatically controlled by a guidance unit 28, which may be one of several types of programming and control systems that are well known in the art of rocketry.

If desired, the multistage rocket power plant 27 may be, for example, the "Scout" rocket developed for the National Aeronautics and Space Agency by Vought Astronautics Division of Chance Vought Aircraft, Inc., Dallas, Tex. Reference is made to the publication entitled "Space Research Vehicle Systems Developed from NASA SCOUT", publication number E9R-12402, dated Aug. 1959 and published by Chance Vought Aircraft, Inc., for details of the Scout rocket. In particular, on page 23 of the Chance Vought publication, there is a description of a guidance system developed by the Minneapolis-Honeywell Regulator Co. which may be used as the guidance unit 28 in the present rocket vehicle 25.

The multistage rocket power plant 27 propels a gross payload 29 to a point near the perigee of the transfer ellipse; that is, near the lowest point of the elliptical trajectory from the outer atmosphere of the earth to the desired orbit. The gross payload 29, best seen in FIGS. 1 and 2, comprises a fifth stage rocket 35, a sixth stage rocket 36 and the satellite 26. The gross payload 29 and the fourth stage rocket 34 are covered by a nose shell or cylindrical heat shield 37 until the launching vehicle 25 leaves the earth's atmosphere. The heat shield 37 is then automatically separated from the gross payload 29 and the fourth stage rocket 34. The construction and method of separation of a typical nose shell is illustrated on page 6 of the Chance Vought publication.

The fifth stage solid-propellant rocket 35, which is secured in tandem to the fourth stage rocket 34, provides the additional thrust required for the satellite 26 to reach the perigee of the transfer ellipse. The fifth stage rocket 35 is provided with means, such as an electrically fused annular explosive charge 38 (FIG. 2) which encircles the case of the fifth stage rocket 35 for reducing the thrust to zero. When detonated, the explosive charge 38 ruptures the combustion chamber of the fifth stage rocket 35.

The sixth stage rocket 36 provides the additional thrust to establish the satellite 26 in the circular orbit from the apogee or highest point of the transfer ellipse. The sixth stage rocket 36 is secured to the satellite 26 on the side opposite the side to which the fifth stage rocket 35 is secured, and is oriented in the opposite direction. That is, the sixth stage rocket 36 is oriented so that the rocket exhaust nozzle extends out from the satellite 26 in the opposite direction from that in which the exhaust nozzle of the fifth stage 35 extends out from the satellite 26. As will be fully apparent hereinafter, this is necessary so that the thrust of the sixth stage rocket 36 will be applied in the correct direction.

Figure 4:
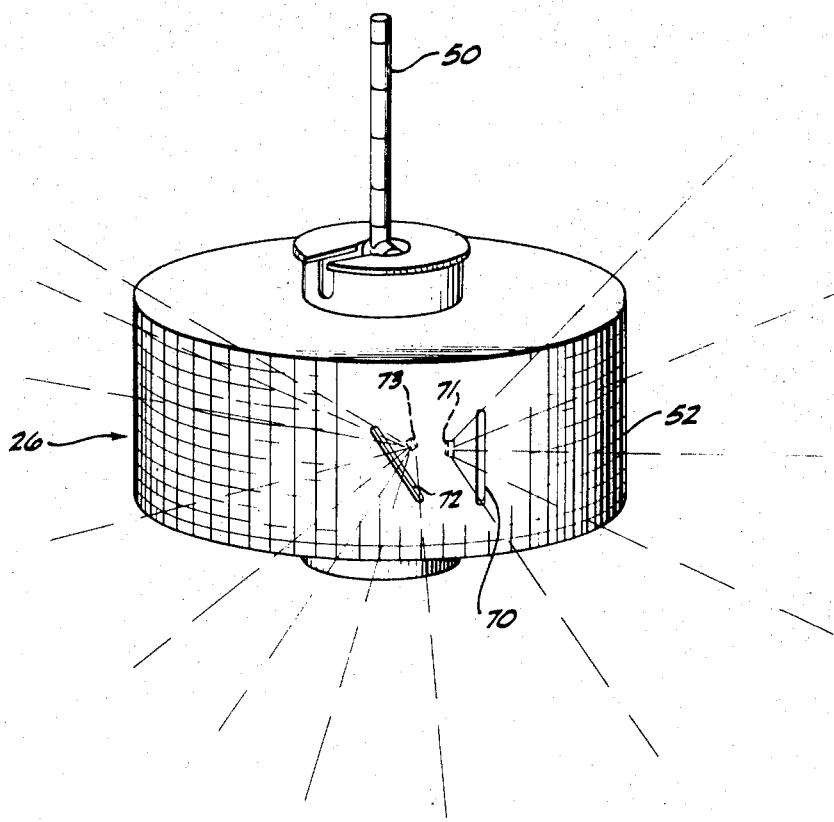
FIG. 4 is a perspective of the satellite illustrating the antenna in its erected position and the solar sensing arrangement.

As may be seen in FIGS. 3, 4 and 5, the satellite 26 is of a cylindrical configuration and may have a diameter of 29 inches, a thickness of 12½ inches, and a weight on the order of 25 pounds, for example. An antenna 50 is secured to one of the plane faces of the satellite 26. After the satellite 26 has reached its predetermined orbit, the antenna 50 extends outwardly from the satellite along an axis extending through the center thereof coaxial with the longitudinal axis of the rocket vehicle 25. This is the spin axis and the antenna axis of the satellite 26. The antenna 50 provides a radiation pattern that is substantially omnidirectional about the antenna axis, but has a narrow beam width about a plane extending through the center of the satellite 26 perpendicular to the axis of the antenna 50. The cylindrical surface of the satellite 26 parallel to the axis of the antenna 50 is provided with solar cells, indicated by the numeral 52, for converting sunlight into electrical energy.

As shown in FIG. 2, the fifth and sixth stage rockets 35 and 36 are secured to the plane faces of the satellite 26 and are adapted to be separated from the satellite when desired. The antenna 50, which is a dielectric-loaded coaxial tranmission line having circumferential slots spaced a half wavelength apart, is pivoted at the surface of the satellite 26. Thus, initially the antenna 50 is folded against the surface of the satellite 26 beneath the fifth stage rocket 35 (see FIGS. 2 and 3). The antenna 50 is spring loaded at the pivot point for erection thereof after separation of the fifth stage rocket 35 from the satellite 26 (FIG. 4).

The satellite 26 is provided with a source of reactive power such as two tanks 53 of gas or condensed liquid and its associated vapor under pressure, for example, compressed nitrogen gas at a pressure of 3,000 pounds per square inch. In the present embodiment, the tanks 53 are of a toroidal configuration and are disposed immediately within the cylindrical surface of the satellite 26. A velocity control valve 54 and an attitude control valve 55 are connected to the tanks 53 (best seen in FIG. 5). The valves 54 and 55 are quick acting, low-leakage solenoid-controlled valves such as the type AF56C-37A manufactured by the Eckel Valve Company of San Fernando, Calif. The velocity control valve 54 is connected to a nozzle 56 disposed at the periphery of the satellite 26 and oriented to provide a jet of nitrogen gas directed radially outward from the center of the satellite 26 along a line perpendicular to the spin axis passing through the center of gravity of the satellite 26. The attitude control valve 55 is connected to a nozzle 57 disposed near the periphery of the satellite 26 and oriented to provide a jet of nitrogen gas directed outward from the satellite 26 along a line parallel to the spin axis of the satellite 26.

Means is provided for absorbing nutation energy such as a nutation damper 58 comprising a sealed arcuate tube 60 which may be four inches in length disposed near the periphery of the satellite 26 (FIG. 5) and oriented generally parallel to the spin axis, the curvature of the tube 60 being concave toward the spin axis. The tube 60 is filled with a viscous fluid 61 such as oil or silicone fluid and contains a spherical steel ball 62, one-fourth inch in diameter, for example. The radius of curvature of the tube 60 may be made equal to its distance from the spin axis divided by 1.4 and multiplied by $$(I_x/[I_z - I_x])^2$$

where $I_x$ is the moment of inertia of the satellite 26 around any axis normal to the spin axis passing through the center of the satellite 26 and $I_z$ is the moment of inertia of the satellite 26 about the spin axis. The factor of 1.4 is necessary because the ball 62 rolls rather than slides in the tube 60. This choice of radius makes the damper resonant at the correct frequency for any spin speed of the vehicle.

The satellite 26 is also provided with means for sensing its orientation with respect to the sun. In FIG. 4 there is shown a slit 70 provided in the cylindrical surface of the satellite 26 providing a fan-shaped angular field of view that extends parallel to the antenna axis. A single orientation sensing solar cell 71 is disposed within the satellite 26 adjacent the slit 70 so that when the sun is within the field of view, which may be 140°, for example, the solar cell 71 is energized to develop a potential at its output terminals. A second slit 72 is provided on the same face of satellite 26 and provides a second fan-shaped angular field of view that intersects the field of view of the first slit 70 at an angle which may be 35°, for example. Similarly, a second orientation sensing solar cell 73 disposed within the satellite 26 develops a potential when the sun is in the field of view of the second slit 72.

Figure 6:
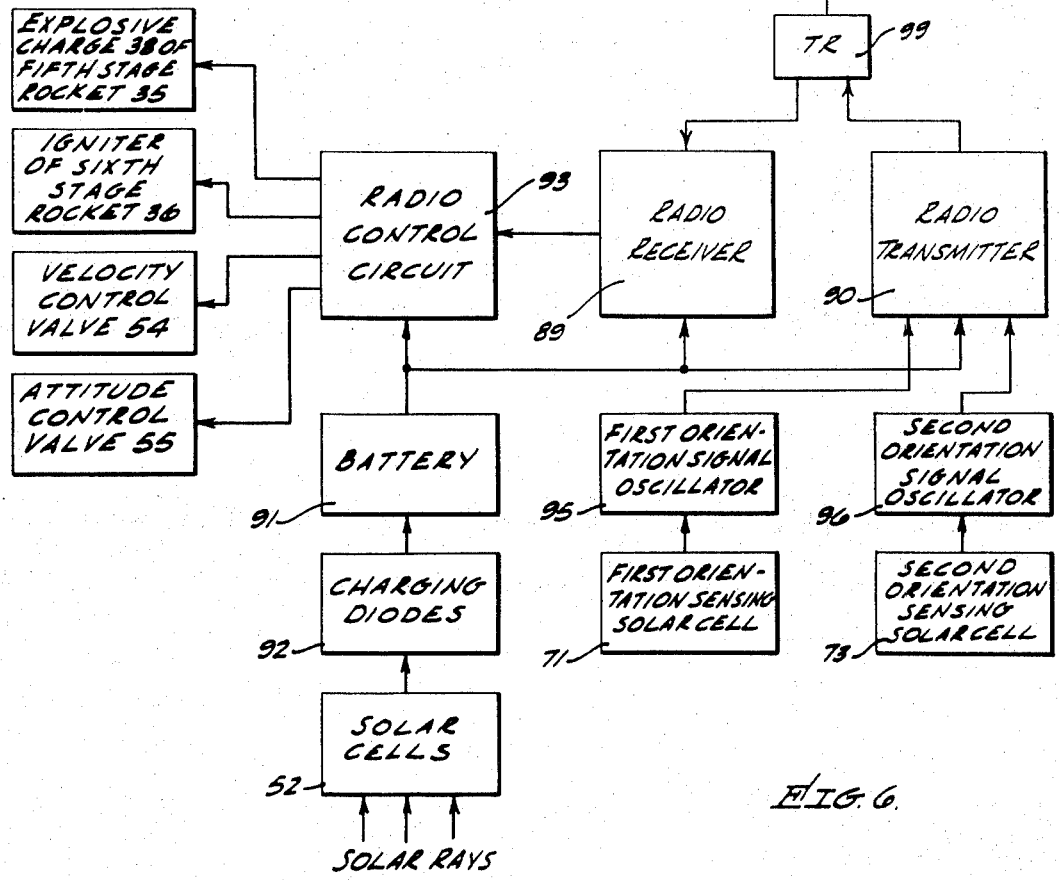
FIG. 6 is a diagram of the satellite radio and electrical system.

As may be seen in FIG. 6, the satellite 26 is provided with a radio receiver 89 and radio transmitter 90 that is electrically connected through a TR switch 99 to the antenna 50 as indicated. A source of potential, such as a storage battery 91, applies electrical power to the radio receiver 89 and radio transmitter 90. The solar cells 52 disposed on the outer surface of the satellite 26 are connected through rectifiers or charging diodes 92 to the battery 91 to maintain it in a charged condition. Approximately 2200 solar cells 52 may be provided and interconnected in banks. The cells 52 in each bank are connected in a series-parallel arrangement, and although there may be different numbers of cells 52 in each bank, the number of cells in series in each series-parallel arrangement is identical to provide the proper voltage for the battery 91. The charging diodes 92 are nonconductive during periods that the voltage developed by any bank of cells 52 drops below that of the battery 91.

A radio control circuit 93 is also connected to the radio receiver 89 and to the battery 91. The radio control circuit 93 is responsive to control signals received by the radio receiver 89 for applying a potential from the battery 91 to the various electrically controlled devices associated with the satellite 26 and with the fifth and sixth stage rockets 35 and 36. The particular radio remote control system utilized may be one of several systems well known in the art, for example, one utilizing subcarrier signals transmitted on a carrier wave. The radio control circuit 93 may, for example, include a number of filters for separating the various subcarrier signals and actuating relays in response thereto, as is well known in the art.

The explosive charge 38 for rupturing the combustion chamber of the fifth stage rocket 35 is connected to the output of the radio control circuit 93. The igniter for the sixth stage rocket 36 is also connected to the output of the radio control circuit 93. A velocity control valve 54 and the attitude control valve 55 are each individually connected to the output of the radio control circuit 93.

The first and second orientation sensing solar cells 71 and 73 are respectively connected to first and second orientation signal oscillators 95 and 96. The orientation sensing solar cells 71 and 73 supply electrical power for the oscillators 95 and 96 so that orientation signals are developed when the solar cells 71 and 73 are illuminated by the sun. The output signals from the oscillators 95 and 96 are applied to the radio transmitter 90 for transmission to a satellite control point. Thus, if the sun passes through the field of view of the second slit 72, a signal will be developed by the second oscillator 96; and if the sun passes through the field of view of the first slit 70, a signal will be developed by the first oscillator 95.

In the construction of the satellite 26, the mass of the units associated with the satellite 26 is accurately determined and the equipment is distributed within the satellite 26 so that the center of gravity is made to coincide with the center of satellite 26; and the axis of maximum moment of inertia is made to coincide with the antenna axis.

Figure 7:
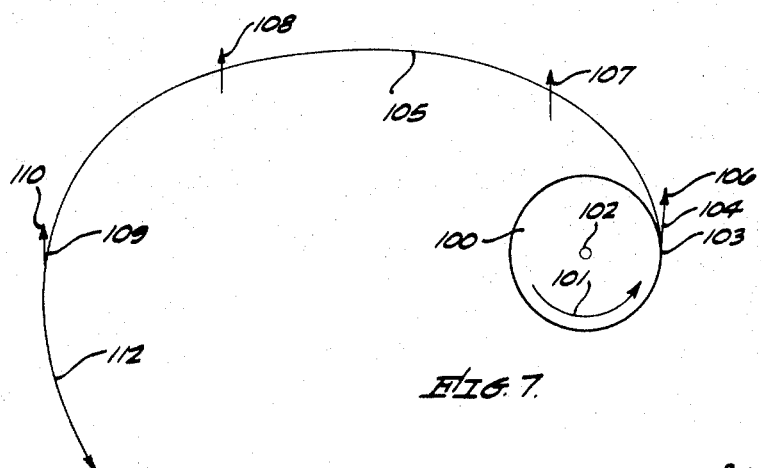
FIG.7 is a diagram of a satellite trajectory from the earth to a predetermined orbit.
Figure 8:
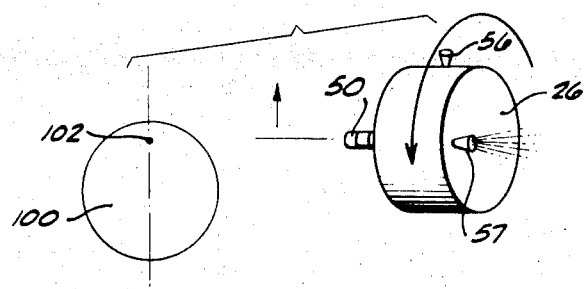
FIG. 8 is a diagram illustrating the initial relationship of the spin axis of the satellite to the earth's axis and the application of a reactive force producing a precessional torque.
Figure 9:
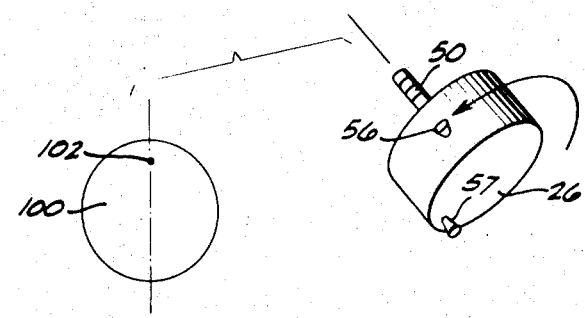
FIG. 9 is a diagraam illustrating the change in satellite orientation resulting from the reactive force depicted as being applied in FIG. 8.
Figure 10:
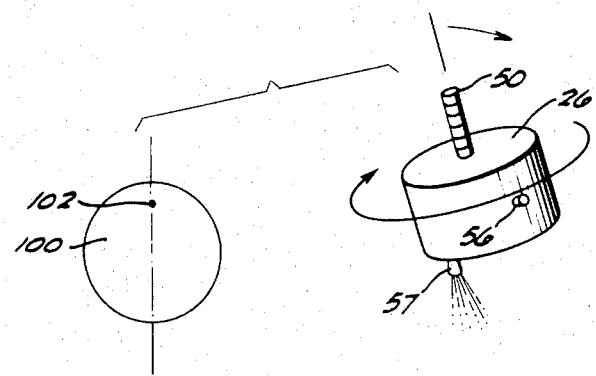
FIG. 10 is a diagram illustrating further reactive force being applied to the satellite.
Figure 11:
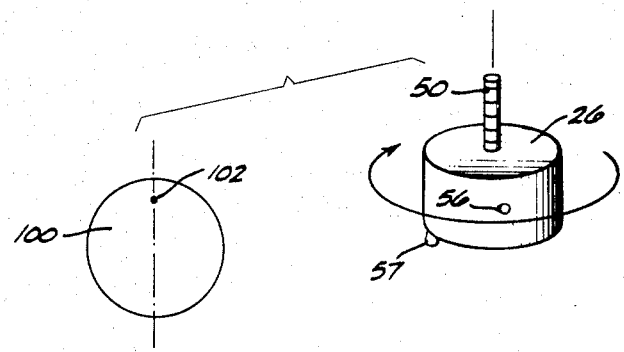
FIG. 11 is a diagram depicting the satellite after orientation by precession has aligned the spin axis of the satellite with the earth's axis.

Referring now to FIG. 7, the earth is represented by the circle designated 100 and is rotating in the counterclockwise direction, indicated by the arrow 101, around an axis 102 represented as going into the drawing through the north pole. The rocket vehicle 25 is fired from a point 103 on the equator of the earth 100, which point may be, for example, Jarvis Island in the Pacific Ocean that is located at 23 minutes south latitude and 160 west longitude. Prior to firing, the battery 91 is completely charged, the nitrogen tanks 53 are pressurized, and the radio receiver 89, the radio transmitter 90 and the radio control circuit 93 are placed in operation. After firing, the first four rockets 31–34 of the propulsion system 27 are automatically fired in sequence and guided by the guidance unit 28. After burnout, each empty rocket case is jettisoned, as is well known in the art.

After the rocket vehicle 25 has attained considerable altitude, the rocket vehicle is automatically turned in an easterly direction to coincide with the direction of rotation of the earth 100, by the guidance unit 28. Prior to ignition of the fourth stage rocket 34, and separation of this rocket from the third stage rocket, the fourth stage rocket 34 has a spin about its longitudinal axis imparted to it at a rate of 2.7 revolutions per second (rps) to provide spin stabilization. The multistage rocket power plant 27 propels the gross payload 29 to a point above the earth 100 near the lowest point or perigee 104 of an elliptical trajectory or transfer ellipse 105.

The fifth stage rocket 35 provides the additional thrust necessary to cause the satellite 26 to reach the perigee 104 and to traverse the transfer ellipse 105. Because the velocity of the satellite 26 at the perigee 104 is quite critical in order to achieve the correct apogee, the velocity is determined from the earth 100 in a well known manner, such as by means of a radio interferometer, a tracking antenna, or by doppler frequency shift measurement techniques, for example. These measurements may make use of the radio receiver 89 and the radio transmitter 90 in the satellite 26 as a radio repeater.

When the correct velocity has been attained, a radio control signal is transmitted from the earth 100 to the satellite 26 to fire the explosive charge 38 and rupture the combustion chamber of the fifth stage rocket 35 to reduce the thrust provided thereby to zero. The fifth stage rocket 35 is then separated from the satellite 26.

A first arrow 106 (FIG. 7) indicates the orientation of the sixth stage rocket 36 and the satellite 26 at the perigee 104 of the transfer ellipse 105 with the arrow pointing in the direction of thrust of the fifth stage rocket 35. Inasmuch as the satellite 26 is spin-stabilized about the rocket axis by the spin imparted by the spin nozzles or spin rockets (not shown) on the fourth stage rocket 34, the satellite 26 and the sixth stage rocket 36 maintains its attitude in space (arrows 107, 108, and 110) as it traverses the transfer ellipse 105 to the other side of the earth 100. As described hereinbefore the sixth stage rocket 36 is secured to the satellite 26 with an orientation such that it applies thrust in the direction opposite to that of the thrust of the fifth stage rocket 35.

At the highest point or apogee 109 of the transfer ellipse 105, the satllite 26 has attained the altitude of the desired circular 24-hour orbit 112, but is traveling at only 5200 fps, which is less than that required for establishment of the satellite 26 in the orbit 112. A radio control signal is transmitted to the satellite 26 to cause ignition of the sixth stage rocket 36 to provide the additional velocity of 4890 fps to establish the satellite 26 into the circular orbit 112. At the apogee 109 on the other side of the earth 100 from the firing point 103, the direction of thrust of the sixth stage rocket 36 is such as to cause the satellite 26 to enter the circular orbit 112 due to the fact that the sixth stage rocket 36 has maintained its attitude in space while traversing the transfer ellipse 105 and due to the fact that the orientation of the sixth stage rocket 36 is opposite to that of the fifth stage rocket 35.

As the satellite 26 traverses its orbit 112, it is spinning about its spin axis with an angular velocity of 2.7 rps imparted to it by the fourth stage rocket 34. However, the spin axis of the satellite 26 is perpendicular to the earth's axis 102, and thus the antenna 50 does not radiate efficiently toward the earth 100. Accordingly, the satellite 26 is reoriented by precessing its spin axis through 90°. Precession is accomplished by the reactive force produced by a jet of nitrogen gas from the attitude control nozzle 57 which applies thrust parallel to the spin axis near the periphery of the satellite 26. The jet of nitrogen gas is controlled by the attitude control valve 55 to produce a net torque around an axis perpendicular to the spin axis of the satellite 26. By periodically pulsing the jet to be on during only a predetermined portion of the spin cycle of the satellite 26, the torque is applied in the correct plane to precess the spin axis through 90° until it is parallel to the earth's axis 102. The attitude control valve 55 may be actuated during only approximately 60° of the spin cycle of the satellite 26, for example.

The attitude control valve 55 is pulsed by radio control from the earth 100. The correct phase of the spin cycle to actuate the valve 55 is determined from the earth 100 by means of the first orientation sensing solar cell 71 adjacent the slit 70 in the satellite 26 and its associated oscillator 95 which modulates the radio transmission from the satellite 26. By correcting for the two-way propagation delay, the jet is turned on during the correct portion of the spin angle of the satellite 26 to cause precession in the proper direction. This action is indicated in FIGS. 8–11.

The amount of precession of the antenna axis of the satellite 26 is determined from the earth 100 by means of the orientation signal developed by the second orientation oscillator 96 associated with the slit 72 and orientation sensing solar cell 73. This determination can be made only during the time of day that the statellite 26 is in sunlight. However, in the equatorial orbit of the present example, only rarely does the earth 100 come between the sun and the satellite 26, and then only for intervals of short duration. As the satellite 26 spins about its spin axis, the slit 72 periodically passes through sunlight. Thus a periodic orientation signal is developed and transmitted to the earth 100 and the orientation of the antenna axis with respect to the sun may be determined. This information tells when the necessary precession has been completed.

Inasmuch as the satellite 26 may have velocity and altitude errors, it traverses only an approximate 24-hour stationary or synchronous orbit 112, and corrections are made by radio control of the velocity control valve 54. The satellite 26 is tracked from the earth 100 by means of radio signals transmitted to the satellite 26 and relayed back to the earth 100 to determine the drift of the satellite 26 relative to the earth 100. The velocity of the satellite 26 is increased or decreased by opening the velocity control valve 54 for controlled time intervals during the proper portion of the spin cycle by means of radio control signals. Opening of the velocity control valve 54 results in jets of compressed nitrogen issuing from the associated nozzle 56 to provide a reactive force that changes the velocity of the satellite 26. This will correct the orbital period and will also reduce or eliminate the eccentricity of the orbit. Inclination of the orbit may be corrected by timing the attitude control valve 55 and nozzle 57 so that "on" periods of the jet produce no net precession. For example, the valve 55 may be opened for one complete revolution of the satellite 26 about the spin axis, which produces no net torque about a single axis and hence no net precession.

When the attitude control valve 55 is opened during one or more complete revolutions of the satellite 26, there is no need to synchronize the opening and closing of the valve 55 to occur at any particular point in the spin cycle. However, when the attitude control valve 55 or the velocity control valve 54 are opened during only a fraction of one spin cycle, or during portions of several successive spin cycles, the operation must be synchronized with the spin of the satellite 26. Synchronization ensures that the net force is applied to the satellite 26 in the proper direction.

Figure 12:
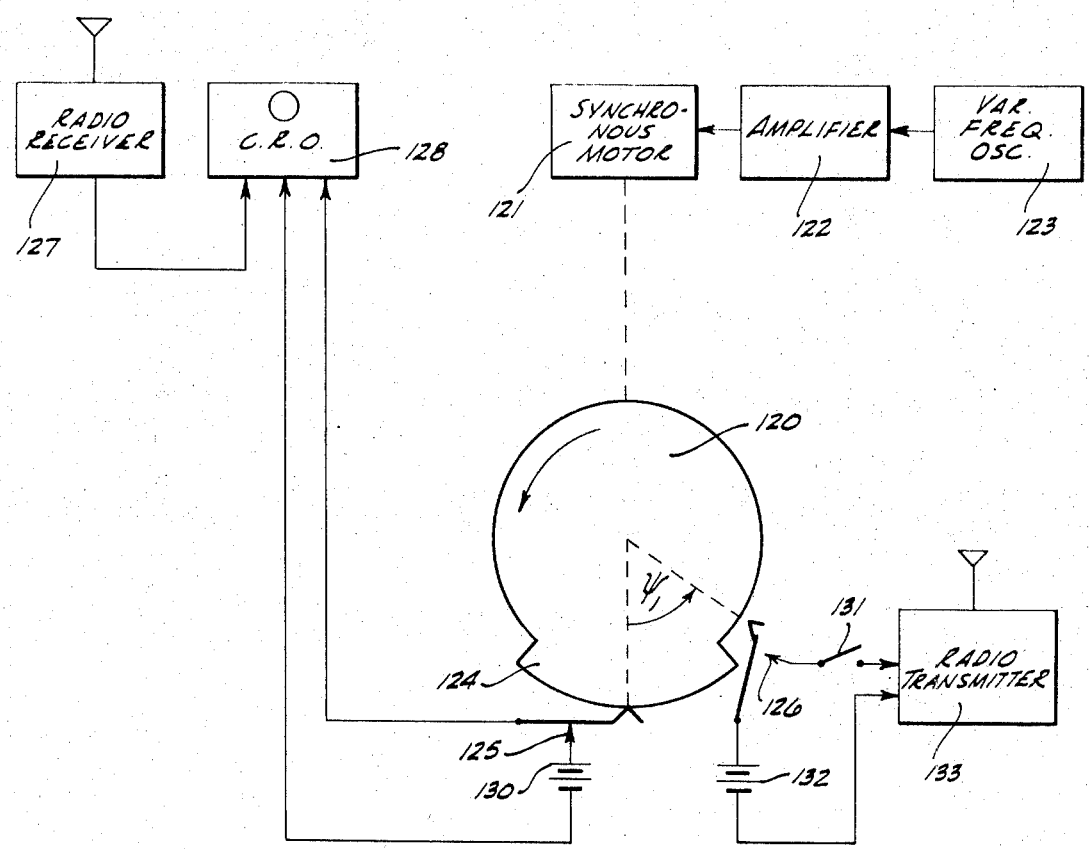
FIG. 12 is a schematic diagram of a synchronous controller for synchronizing the force applied to the satellite with the spin cycle of the satellite.

As an example of one means of controlling the starting time and duration of pulses to the jet control valves 54 and 55, in such a way as to result in thrust during the correct portion of each spin revolution, cam-controlled contacts or switches may be used. Referring to FIG. 12, there is provided a cam 120 driven by a variable speed drive means, such as a synchronous motor 121 excited through an amplifier 122 by a variable frequency oscillator 123. The cam 120 has a lobe 124 whose width is equal to the desired angular duration of the jet command pulses, which may be 60°, for example. The cam lobe 124 actuates two switches, 125 and 126. Switch 125 is fixed to the frame supporting the cam 120, and its closure by the cam lobe 124 is used to define a reference instant on each revolution of the cam 124. The time of closure of switch 125 is compared with the time of occurrence of a signal from the sensing solar cell 71, or other spin angle reference signal, transmitted from the satellite 26, and the speed of the motor 121 is adjusted so as to cause these two times to be the same. For example, the signal from solar cell 71 is received by a radio receiver 127 and applied to a cathode ray oscilloscope 128. The closure of switch 125 applies a voltage from a battery 130 to the cathode ray oscilloscope 128. In this manner, the two times may be compared. The speed of the motor 121 is then adjusted manually until the two signals coincide in time. In the present example, the frequency of the signal from the variable frequency oscillator 123 is adjusted to cause time coincidence. It is also possible to measure the difference in time electronically and to develop suitable electrical signals for automatic control of the speed of the motor 121 which will cause the time difference to approach zero.

When the switch 125 closes each time that the signal from the satellite's spin angle reference (for example, solar cell 71) is received, the cam 120 has been synchronized with the spin of the satellite 26. If there were no time required for signals to propagate from the satellite 26 to Earth, then, at any instant, the angle between the leading edge of the cam lobe 124 and the actuator of switch 125 would be equal to the angle between the plane of the fan-shaped field of view of the sensing solar cell 71, and a plane extending longitudinally through the spin axis of the satellite 26 along a line to the Sun. With one-way propagation time $t_p$, the former angle is less than the latter by the amount $\omega t_p$, where $\omega$ is the spin rate of the satellite 26.

In order to generate command signals for the valves 54 and 55, switch 126 is employed. Switch 126 is mechanically mounted in such a way that it can be placed in any desired angular position around the cam 120, relative to switch 125. Switch 126 is closed by the cam 120 for the desired portion, say 60°, of the spin revolution. When it is desired to transmit jet command signals, a switch 131 is closed manually so that during each time interval that switch 126 is closed by the cam lobe 124, a voltage from a battery 132 is applied to the radio transmitter 133. The particular subcarrier frequency selected to be radiated by the transmitter 133 determines whether the jet command signal is applied to valve 54 or valve 55.

In order to control the starting time or spin angular position of the pulses, considering the propagation time of the sensor and command signals, let $\psi_1$ be the angle from switch 125 to switch 126 measured in the sense of rotation of the cam 120. Let $\psi_A$ be the angle between the plane of the fan-shaped field of view of the sensing solar cell 71, and the plane longitudinally through the spin axis of the satellite 26 along the sun line, which exists at the time the command pulse begins to be received at the satellite 26. Then $$\psi_A = \psi_1 + 2\omega t_p.$$

The angle between the average force produced by the nozzle 56 controlled by valve 54, or the torque produced by nozzle 57 controlled by valve 55, and the reference plane (in the present example the plane of the spin axis and the sun line), is $\psi$. This angle $\psi$ is equal to $\psi_A$ plus a constant $\psi_d$ which depends on the orientation of the nozzle with respect to the plane of the sensor, the duration of the pulse sent to the valve, and time delays in the valve and in the electronic circuits. The constant $\psi_d$ may be determined by tests and calculations before the satellite is launched. We then have by substitution for $\psi_A$ $$\psi = \psi_1 + \psi_d + 2\omega t_p \text{ or}$$

$$\psi_1 = \psi - 2\omega t_p - \psi_d$$

from which equation the required angular position of the command generating switch 126 may be calculated to produce a desired acceleration or precession.

As stated hereinbefore, the antenna axis of the satellite 26 is the axis of the maximum moment of inertia. This provides stability against the effects of vibration and associated energy loss that would otherwise tend to orient the spin around the axis of the largest moment of inertia, if it were other than the antenna axis. In this way, the effects of such vibration are to cause the spin to stabilize about the desired axis, that is, to damp the nutation. In addition to the natural tendency of the satellite 26 to damp nutation, the nutation damper 58 further reduces any nutational motion by absorbing the nutation energy. The nutation damper 58 is resonant at the correct frequency regardless of spin if the radius of curvature of the tube 60 is chosen as indicated hereinbefore. When precession is accomplished in a constant direction by a series of pulses, the nutation resulting from a single pulse does not build up so that only a small damper 58 is required.

Thus, the satellite 26 is made to orbit around the earth 100 with the same angular velocity as the earth 100 and in the same direction of rotation. The antenna axis of the satellite 26 is parallel to the axis of rotation 102 of the earth 100 so that the antenna 50 radiates signals to the earth 100 in a narrow beam and the solar cells 52 are oriented to receive optimum light from the sun.

As to the disclosed means for sensing the orientation of the satellite 26, namely, the slits 70 and 72, orientation sensing solar cells 71 and 73, and the orientation oscillators 95 and 96, it will be understood that other means may be provided. For example, asymmetry may be deliberately introduced into the antenna radiation pattern of the satellite 26.

It will be obvious that more than one jet nozzle may be provided for velocity control or for attitude control. Several jets of gas may be produced at different locations on a spinning vehicle, each jet being pulsed and timed or synchronized as described hereinbefore with reference to a single jet. Further, a jet or jets may be produced on a spinning body to achieve simultaneous change in velocity and attitude so as to realize, for example, a proportional navigation course. By this means a target seeking vehicle may be constructed in accordance with the invention.

It will also be apparent that valves may be pulsed or modulated in accordance with desired functions of time, such as portions of sine waves, for example, to provide smoother control. In addition, jet control systems in accordance with the invention may be used for other types of satellites than communication satellites. For example meteorological, astronomical or navigational satellites may also be spinstabilized and controlled by pulsed jets of gas to change velocity or attitude of the spin axis in space, or both. Furthermore, the principles embodied in the present invention may also be applied to vehicles for probing into space and for intercepting other space vehicles.

Thus, there has been described a method and apparatus for launching a satellite into a particular orbit, and with a predetermined orientation with respect to the earth, to provide optimum antenna gain and optimum solar cell illumination. By using simple spin-stabilization to orient the satellite, the weight and complexity of the satellite have been minimized. A method and apparatus has been described for precesing the spin axis of a spin-stabilized body from a first position to a second position perpendicular to the first position, and for damping of nutation. Further, a method and apparatus has been described for correcting the orbit of a spin-stabilized satellite.

Although only one embodiment of the invention has been shown and described, variations may be made and it is intended that the foregoing disclosure is to be considered only as illustrative of the principles of the invention and not construed in a limiting sense.

What is claimed is:

1. Apparatus comprising:
   a. a body adapted to spin about an axis;
   b. fluid supply means associated with said body;
   c. a valve connected to said fluid supply means;
   d. fluid expulsion means disposed on said body and coupled with said valve and oriented to expel said fluid substantially along a line parallel to said axis and separated therefrom;
   e. means disposed on said body for providing an indication to a location external to said body of the instantaneous spin angle position of said body about said axis and the orientation of said axis with reference to a fixed external coordinate system;
   f. and means disposed on said body for receiving from said location control signals synchronized with said indication;
   g. said valve being coupled to said last-named means and responsive to said control signals for applying fluid to said fluid expulsion means in synchronism therewith for precessing said body to orient said axis in a predetermined desired relationship with said fixed external coordinate system.

2. Apparatus for applying force to a spinning body by control from a location external to said body comprising:
   a. a body adapted to spin about a spin axis passing through the center of gravity thereof;
   b. means for supplying fluid under pressure disposed within said body;
   c. a controllable valve connected to said means for supplying a fluid;
   d. jet-forming means disposed on said body and directed along a line substantially parallel to said spin axis and spaced apart therefrom;
   e. said valve being connected to said jet-forming means for supplying fluid thereto when actuated;
   f. wide angle means disposed on said body for providing an indication to a location external to said body of the instantaneous spin angle position of said body about said spin axis and the orientation of said spin axis with reference to a fixed external coordinate system;
   g. and means disposed on said body for receiving from said location control signals synchronized with said indication;
   h. said valve being coupled to said last-named means and responsive to said control signals for the actuation of said valve for precessing said body to orient said spin axis into a predetermined desired relationship with said fixed external coordinate system.

3. Apparatus for applying torque to a body spinning about a spin axis by control from a location external to said body, said torque being applied about a predetermined axis normal to said spin axis to precess said spin axis to point in a desired direction comprising:
   a. a body adapted to spin about a spin axis passing through the center of gravity thereof;
   b. fluid supply means for supplying a fluid under pressure disposed within said body;
   c. a controllable valve connected to said fluid supply means;
   d. fluid expulsion means coupled to said valve and attached to said body and oriented to expel said fluid from said body substantially along a line parallel to said spin axis and spaced apart therefrom to enable torque to be applied about any axis normal to said spin axis passing through the center of gravity of said body;
   e. wide angle optical means disposed on said body for providing an indication to a location external to said body of the instantaneous spin angle position of said body about said spin axis and the orientation of said spin axis with reference to a fixed external coordinate system;

f. and means disposed on said body for receiving from said location control signals synchronized with said indication;

g. said valve being coupled to said last-named means and responsive to said control signals for the repetitive actuation of said valve for precessing said body to orient said spin axis into a predetermined desired relationship with said fixed external coordinate system.

* * * * *